(12) United States Patent
Siew et al.

(10) Patent No.: US 7,785,645 B2
(45) Date of Patent: Aug. 31, 2010

(54) PROCESS FOR OBTAINING AN OIL COMPOSITION AND THE OIL COMPOSITION OBTAINED THEREFROM

(75) Inventors: Wai Lin Siew, Selangor (MY); Nor Aini Bt. Haji Idris, Selangor (MY); Kien Yoo Cheah, Selangor (MY)

(73) Assignee: Malaysian Palm Oil Board, Kajang, Selangor (MY)

( * ) Notice: Subject to any disclaimer, the term of this patent is extended or adjusted under 35 U.S.C. 154(b) by 589 days.

(21) Appl. No.: 10/676,084

(22) Filed: Oct. 2, 2003

(65) Prior Publication Data

US 2004/0224071 A1 Nov. 11, 2004

(30) Foreign Application Priority Data

May 5, 2003 (MY) ............................. PI 20031673

(51) Int. Cl.
*A23D 9/00* (2006.01)
(52) U.S. Cl. ...................................... 426/606; 426/601
(58) Field of Classification Search ......... 426/601–613
See application file for complete search history.

(56) References Cited

U.S. PATENT DOCUMENTS

| | | | | |
|---|---|---|---|---|
| 500,975 | A | * | 7/1893 | Tomarelli ................. 106/651 |
| 4,282,265 | A | * | 8/1981 | Theuer ..................... 426/607 |
| 4,948,811 | A | | 8/1990 | Spinner et al. ............ 514/560 |
| 5,000,975 | A | * | 3/1991 | Tomarelli ................. 426/602 |
| 5,578,334 | A | | 11/1996 | Sundram et al. .............. 426/2 |
| 5,601,860 | A | * | 2/1997 | Lien et al. .................... 426/72 |
| 5,843,497 | A | | 12/1998 | Sundram et al. .............. 426/2 |
| 5,874,117 | A | | 2/1999 | Sundram et al. .............. 426/2 |
| 6,034,130 | A | | 3/2000 | Wang et al. ................ 514/558 |
| 6,136,858 | A | * | 10/2000 | Kuchan et al. ............. 514/560 |

OTHER PUBLICATIONS

Taylor, A. M. 1976. Oleagineux 31(2)73-79.*
Swern, D. et al, ed. 1979. Bailey's Industrial OII and Fat Products, John Wiley & Sons, New York, p. 383,394, 399, 430.*
Kellens, M. 1996. C37: Developments in Fractionation Technology: Use of High Pressure Membran Filter Press in Dry Fractionation. Proceedingis of the 1996 PORIM International Palm Oil Congress, Palm Oil Research Inst., Kuala Lampur, Malaysia, p. 335-345.*
Lin, S. W. 1999. Crystallization Behaviour of Palm Oleins and Some Blended Products, Proceedings of the 1999 PORIM International Palm Oil Congress, Palm Oil Research Institute, Kuala Lampur, Malaysia, p. 82-93.*
Tirtiaux, A. 1989. Lipid Technology 1(1)17-20.*
Gibon, V, et ak, 2002. Lipid Technology Mar. 2002, p. 33-36.*
Swern, D. 1979. Bailey's Industrial Oil and Fat Products, vol. 1, $4^{th}$ edition, John Wiley & Sons, New York, p. 378.*
Watanabe, A 1 et a1992. JAOCS 69(11)1077.*
Hashimoto, S. et al. 2001. JAOCS 78(5)455.*
Chen, C. et al 2002/ JAOCS 79(4)403.*
Wai Lin Siew, Crystallization Behaviour of Palm Oleins and Some Blended Products, Palm Oil Research Institute of Malayaia International Palm Oil Congress, Feb. 1-6, 1999, pp. 82-93.

* cited by examiner

*Primary Examiner*—Carolyn A Paden
(74) *Attorney, Agent, or Firm*—Morgan Lewis & Bockius LLP

(57) ABSTRACT

The present invention relates to a process of producing an oil composition by blending and fractionation steps and the oil composition obtained therefrom. The invention is directed to any vegetable oils such as palm oil, palm olein or palm stearin blends with unsaturated oils of soybean, corn, canola, rapeseed, sunflower oil, where the oleic content is more than 20% and the linoleic and linolenic contents are more than 30%. The new liquid oil is clear and is used as salad oils, cooking oils, etc. The stearins from such blends are of use in margarine and shortenings.

22 Claims, No Drawings

PROCESS FOR OBTAINING AN OIL COMPOSITION AND THE OIL COMPOSITION OBTAINED THEREFROM

FIELD OF THE INVENTION

The present invention relates to a process for obtaining an oil composition and the oil composition obtained therefrom. More particularly, the present invention relates to a process for obtaining an oil from palm oil, palm olein or palm stearin blends with unsaturated oils of soybean, corn, canola, rapeseed, sunflower oil and the oil obtained therefrom.

BACKGROUND OF THE INVENTION

Fractionation of oils and fats is a well-known process for modifying the composition of natural oils. Various processes are patented by companies such as Alfa Laval, Tirtiaux, De Smet, etc. using dry, detergent or solvent technique. Natural fats are composed of complex mixtures of triacylglycrols, diacylglycerols, and minor components consisting of tocopherols/tocotrienols, sterols and other unsaponifiables. The melting and crystallisation behaviour of the oil depends on the fatty acid and triacylglycerols in the oil.

In order to obtain a more liquid fraction of palm oil, it is possible to segregate the higher melting triacylglycerols through cooling process thereby leaving the unsaturated portion of the triacylglycerols which is filtered through membrane presses. Multiple step fractionation has been recommended to obtain a much higher unsaturated olein fraction. Increasing usage of palm oil in the world markets calls for products which have high fluidity and clarity at low temperatures. It is possible by blending to achieve oils with more fluidity by blending palm olein with unsaturated oils.

Most unsaturated oils are high in linoleic and linolenic fatty acids. The exception is olive oil which is high in oleic acid and is touted as the best oil for human consumption. Moreover, with more health conscious consumers, the trend is towards having fats of less saturation and less polyunsaturation. New oils have been developed through plant engineering and breeding for such modified compositions.

It is well known among the artisans in the field of the invention that normal palm olein with iodine value (IV) of 56 has oleic content of 43% to 45%, linoleic content of 11% to 14% while that of IV 65 has oleic content of 47% to 49% and linoleic content of 14% to 16%. The saturated fatty acids content is between 29% to 31%.

Considerable attention in recent years has been paid in this field and some of the inventions have been patented. U.S. Pat. No. 4,948,811 is directed to triglyceride cooking/salad oil compositions with balanced fatty acid ester content to achieve health benefits. The fatty acid ester content of the triglyceride of the oil comprises from about 60% to about 92% oleic, from about 5% to about 25% linoleic, from 0% to about 15% α-linolenic and less than 3%, preferably less than 1% saturated fatty acids.

Both U.S. Pat. No. 5,843,497 and its continuation-in-part, U.S. Pat. No. 5,578,334, relate to fat blends and methods for their manufacture and use in foods to stabilise or lower the low density lipoprotein cholesterol (LDL or LDL-C) concentration and increase the high density lipoprotein cholesterol (HDL or HDL-C) concentration in human serum.

U.S. Pat. No. 5,874,117 features the blending of corn oil with palm oil and other palm fractions to obtain shortening blends with good resistance to oxidation. More specifically, these shortening blends are produced by simple blending of commercially available palm oil, fractionated palm oil components (the olein, superolein, stearin, and mid-fraction components), and/or palm kernel oil with corn oil. Such shortenings represent a cost-effective alternative to those produced by partial hydrogenation of vegetable oils, interesterification of fats and oils, and supplementation of oxygen-susceptible fats and oils with antioxidants.

U.S. Pat. No. 6,034,130 provides a synthetic triacylglycerol (TAG) composition which is whose composition and structure are close to those of human milk, using a synthesised process for incorporating polyunsaturated fatty acids (PUFAs) which does not cause significant destructive oxidation of the PUFAs.

Further, a research paper which was written by one of the present inventors, Dr. Siew Wai Lin entitled Crystallisation Behaviour of Palm Oleins and Some Blended Products was published during the Palm Oil Research Institute of Malaysia International Palm Oil Congress (PIPOC) held on 1 to 6 Feb. 1999. In this paper, the crystallisation behaviour of different types of palm oleins (based on IV) was discussed in relation to their chemical properties. In addition, a study on fractionation of palm oil containing small quantities of unsaturated oils was also reported. Oleins of excellent cold stability are achievable through the process discussed in the paper.

SUMMARY OF THE INVENTION

Accordingly, there is provided a process for obtaining an oil composition, the process including the steps of (a) blending a vegetable oil with an unsaturated oil having an oleic content of more than 20% and linoleic and linolenic contents of more than 30% in a predetermined ratio to form a mixture, (b) heating the mixture at a temperature of between 50° C. to 75° C. until all crystals are melted, (c) cooling the liquid obtained from step (b) to obtain a mixture of oil and crystals wherein the crystals are of a suitable size and shape which permits efficient separation of the oil and the crystals and (d) separating the mixture of oil and crystals to obtain the oil composition.

Further, there is also provided an oil composition obtained from a process for obtaining oil composition which includes the steps of (a) blending a vegetable oil with an unsaturated oil having an oleic content of more than 20% and linoleic and linolenic contents of more than 30% in a predetermined ratio to form a mixture, (b) heating the mixture at a temperature of between 50° C. to 75° C. until all crystals are melted, (c) cooling the liquid obtained from step (b) to obtain a mixture of oil and crystals wherein the crystals are of a suitable size and shape which permits efficient separation of the oil and the crystals and (d) separating the mixture of oil and crystals to obtain the oil composition.

The present invention consists of certain novel features and a combination of parts hereinafter fully described and particularly pointed out in the appended claims, it being understood that various changes in the details may be without departing from the scope of the invention, or sacrificing any of the advantage of the present invention.

DETAILED DESCRIPTION OF THE PREFERRED EMBODIMENTS

The present invention relates to a process for obtaining an oil composition and the oil composition obtained therefrom. More particularly, the present invention relates to a process for obtaining an oil from palm oil, palm olein or palm stearin blends with unsaturated oils of soybean, corn, canola, rapeseed, sunflower oil and the oil obtained therefrom. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

Vegetable oil such as palm oil, olein or stearin is mixed with an unsaturated oil such as soybean oil, sunflower oil, corn oil, canola oil, rapeseed oil whereby the proportion added is not so high as to defeat the purpose of the fractionation process and the feasibility of the process in terms of practical value. The oleic content of the unsaturated oil is more than 20% and the linoleic and linolenic contents are more than 30%. The new liquid oil obtained from the process is clear and can be utilised as salad oils, cooking oils, etc. The stearins from such blends are of use in margarine and shortenings.

In order to produce a fraction with a much lower unsaturation, it is the invention step that the small amount of unsaturated oil will enhance the fractionation process in such a way that most of the unsaturated triacylglycerols can be effectively retained in the liquid phase.

In accordance with the process, there is cooling in the oil matrix from a temperature of above the melting point of the oils to that of temperatures from 8° C. to 20° C.

In accordance with the invention, the crystallising duration may range from 4 to 24 hours. Performing the process in accordance with the invention can provide substantial advantages in terms of the products having oil composition of higher nutritive value. Moreover, the oil obtained from the process having a higher IV and remains liquid at 15° C.

In accordance with invention, there is the advantage of obtaining liquid fraction containing compositions of saturated fatty acids:monounsaturated fatty acids:polyunsaturated acids in the ratio of 1:1:1. The advantage of such oil composition is seen in the AHA step 1 diet, recommended by the American Heart Association (AHA). In accordance with this invention, there is also a fraction obtained whereby the monounsaturated content, if 1, while that of saturated may be 1.0 or higher, and the polyunsaturates are much lower as shown in Examples 4 and 5. Also, it is possible by way of this invention to get saturates and polyunsaturates slightly lower than the monounsaturates as shown in Examples 7 and 8. It is also possible by way of this invention to obtain oils with monounsaturates and polyunsaturates close to ratio of 1.0 while the saturates is slightly lower, as shown in Examples 8 and 9. In order to achieve the 1:1:1 combination for saturate:monounsaturated:polyunsaturated using pure blending alone, one has to combine palm olein with IV of 60 with as much as 60% corn oil or 40% soybean oil.

According to the present state of the art, palm olein of IV 56 is required to be blended in much higher proportion of unsaturated oil in order to achieve enough of polyunsaturation. However, according to the present invention, it is possible to use normal palm oil and blending with much lower percentage of unsaturated oils.

By way of this invention, it is possible to obtain oil with composition ratio similar to that of olive oil, for example as shown in Example 10.

And, it is also possible to obtain oil whereby the composition is suitable for infant fat formula, such that palmitic acid, oleic acid and linoleic acid are within the expected range of infant fats and milk from lactating mothers, as shown in Example 11.

In the currently existing palm oil fractionations, after melting at a temperature of 60° C. to 70° C., palm oil is crystallised under suitable cooling conditions. Crystals are filtered by low or high pressure filter press. Under these conditions, the oil obtained would generally have IV close to 56, which upon further fractionation to a lower temperature would yield oil of higher IV of 60 to 65.

In the fractionation process of the present invention, three successive stages are required. In the invention, the blending of the oil mixture must be of suitable melting and crystallisation properties. The most suited cooling curves are checked from Differential Scanning Calorimetry (DSC) profiles of its cooling and melting programmes. Prior analyses of the oil blends by DSC will enable the most suitable cooling program to be used. Blending may be from 9:1 to 1:9 of palm oil:unsaturated oil. The best blends obtained are in the region of 9:1 to 5:5. Firstly, the oil mixture is heated till all crystals are melted. Cooling of liquid to produce nucleation is followed by growth of crystals to a size and shape that permit efficient separation. Separation and purification of the solids from the liquid phase is the last stage of the process.

Crystallisation of the oil blends is performed with a crystalliser having tubular design, with separate cooling jacket. Crystallisers must have a high cooling surface to oil volume ratio and high heat exchange coefficient. Crystallisers must be equipped with stirrers, the design of which must be able to continuously melt crystals away from heat exchangers. This is particularly crucial when temperature is low. During cooling, crystal size should preferably be controlled to suitable polymorphs and should be of generally uniform size, which allow ease of filtration. Oils and fats have complex triacylglycerols which crystallises either separately or in mixed crystals, depending upon conditions of cooling. Various types of polymorphs are also formed such as alpha, beta and beta prime crystals. These different forms of crystals have different properties in terms of melting points and filterability. These crystal forms may change from one to the other, depending upon cooling conditions. In processes where mixed polymorphs are formed, these mixed polymorphs tend to cause interlocking of the crystalline dendrites thereby causing problems in filtration and thus product quality varies in composition. According to this invention, it is the objective of obtaining a beta prime form of crystals of regular shape and size and removing some of the harder melting triglycerides to finally arrive at compositions of interest. Filtration must be in cooled conditions, preferable to be at least 10° C. below ambient. Filter cloth should be of suitable size such that crystals do not seep through during filtration.

From the present invention, the IV of oleins obtained from palm oil and SBO having the ratio of 9:1 ranges from 69 to 80 whereas for 7:3 ratio, the range is from 81 to 96. The IV of oleins obtained from palm stearin and SBO having the ratio of 7:3 ranges from 77 to 99.

Following is a description by way of examples of the process of obtaining oil from a blending and fractionation process and the oil obtained therefrom.

Example 1

Palm oil is heated to 65° C. to 80° C. to ensure all crystal history is deleted from memory. Soybean oil, sunflower oil or corn oil is mixed with palm oil in the ratio of 9:1 where palm oil is in higher proportion. Mixing of the oil at these temperatures must be continued till homogenous blend is obtained. Fractionation is carried out at 20° C., 10° C. and then 8° C. The first fraction which was obtained at 20° C. is filtered and subsequently, the oil is cooled to the next temperature till the crystals obtained have the composition observed in Table 4. Filtration of the oil products is achieved through membrane filter press of at least 4 bar. The saturated:monounsaturated:polyunsaturated ratios can range from 0.5 to 1.0 for saturated acids, 1.0 for monounsaturated acids and 0.4 to 0.6 for polyunsaturated acids.

TABLE 1

Major fatty acids of oleins from palm oil and unsaturated oil blends (9:1)

| | C14 | C16 | C18 | C18-1 | C18-2 | C18-3 | Sat | Mono | Poly | IV |
|---|---|---|---|---|---|---|---|---|---|---|
| At 8° C. | | | | | | | | | | |
| Palm oil:SFO | 0.8 | 25.8 | 3.2 | 46.9 | 22.2 | 0.5 | 0.6 | 1.0 | 0.5 | 79.8 |
| Palm oil:SBO | 0.8 | 27.6 | 3.1 | 45.8 | 20.2 | 1.7 | 0.7 | 1.0 | 0.4 | 78.5 |
| Palm oil:CO | 0.8 | 27.6 | 2.9 | 46.2 | 21.1 | 0.7 | 0.7 | 1.0 | 0.5 | 77.8 |
| At 10° C. | | | | | | | | | | |
| Palm oil:SFO | 0.9 | 28.1 | 3.3 | 45.3 | 21.4 | 0.2 | 0.7 | 1.0 | 0.5 | 76.3 |
| Palm oil:SBO | 0.8 | 29.0 | 3.2 | 44.5 | 20.0 | 1.7 | 0.7 | 1.0 | 0.4 | 77.0 |
| Palm oil:CO | 0.9 | 28.3 | 3.0 | 44.5 | 21.8 | 0.4 | 0.7 | 1.0 | 0.5 | 76.8 |
| At 20° C. | | | | | | | | | | |
| Palm oil:SFO | 0.8 | 33.3 | 4.1 | 42.6 | 17.9 | 0.6 | 0.9 | 1.0 | 0.4 | 68.9 |
| Palm oil:SBO | 0.9 | 33.4 | 4.0 | 42.3 | 17.3 | 1.4 | 0.9 | 1.0 | 0.4 | 69.8 |
| Palm oil:CO | 0.8 | 32.4 | 3.8 | 43.1 | 17.8 | 0.7 | 0.9 | 1.0 | 0.4 | 69.0 |

Example 2

Palm oil is blended with soybean oil, sunflower oil or corn oil in the ratio of 7:3 and fractionation carried out at 20° C., 10° C. and then 8° C. as in Example 1. The composition of the liquid fraction is shown below. The composition obtained at these conditions have monounsaturated fatty acids in the ratio of almost 1 while that of saturated and polyunsaturated fatty acids are less than 1. The saturated:monounsaturated:polyunsaturated fatty acid ratios may range from 0.6 to 1.0, 1.0 or 0.7 to 1.0.

TABLE 2

Major fatty acids of oleins obtained from palm oil:unsaturated oil blends

| | C14 | C16 | C18 | C18-1 | C18-2 | C18-3 | Sat. | Mono. | Poly | IV |
|---|---|---|---|---|---|---|---|---|---|---|
| At 8° C. | | | | | | | | | | |
| Palm oil: SFO (7:3) | 0.7 | 23.6 | 3.7 | 38.2 | 33.3 | — | 0.7 | 1.0 | 0.9 | 90.1 |
| Palm oil: SBO (7:3) | 0.7 | 23.1 | 3.2 | 37.2 | 32.9 | 2.8 | 0.7 | 1.0 | 1.0 | 95.7 |
| Palm oil: CO (7:3) | 0.7 | 23.8 | 3.0 | 39.0 | 31.8 | 0.8 | 0.7 | 1.0 | 0.8 | 90.2 |
| 10° C. | | | | | | | | | | |
| Palm oil: SFO (7:3) | 0.7 | 22.6 | 3.4 | 38.4 | 34.4 | 0.2 | 0.7 | 1.0 | 0.9 | 92.7 |
| Palm oil: SBO (7:3) | 0.7 | 26.8 | 3.4 | 37.6 | 30.5 | 1.0 | 0.8 | 1.0 | 0.9 | 87.4 |
| Palm oil: CO (7:3) | 0.7 | 23.0 | 3.0 | 38.9 | 32.0 | 0.8 | 0.7 | 1.0 | 0.8 | 90.5 |
| At 20° C. | | | | | | | | | | |
| Palm oil: SFO (7:3) | 0.7 | 29.7 | 3.9 | 36.8 | 28.6 | 0.2 | 0.9 | 1.0 | 0.8 | 81.3 |
| Palm oil: SBO (7:3) | 0.7 | 29.1 | 3.8 | 36.1 | 28.0 | 2.2 | 0.9 | 1.0 | 0.8 | 84.8 |
| Palm oil: CO (7:3) | 0.7 | 28.3 | 3.6 | 37.8 | 27.6 | 0.8 | 0.9 | 1.0 | 0.8 | 82.0 |

Example 3

Palm stearin is heated to at least 10° C. above its melting point and maintained at such temperature to ensure complete melting of previous crystal history. It is then blended with soybean oil, sunflower oil or corn oil in the ratio of 7:3 and fractionation carried out at 20° C., 10° C. and 8° C. The composition of the oil products are as shown in Table 3. The ratios for saturated fatty acids:monounsaturated fatty acids: polyunsaturated fatty acids are in the range of (0.5 to 1.0): 1.0:(0.3 to 1.2).

TABLE 3

Major fatty acids of oleins from fractionation of palm stearin:unsaturated oil blends (7:3)

| | C14 | C16 | C18 | C18-1 | C18-2 | C18-3 | Sat. | Mono | Poly. | IV |
|---|---|---|---|---|---|---|---|---|---|---|
| At 8° C. | | | | | | | | | | |
| Palm st:SFO | 0.8 | 23.2 | 2.5 | 55.7 | 16.6 | 0.3 | 0.5 | 1.0 | 0.3 | 77.3 |
| Palm st:SBO | 0.6 | 23.1 | 3.2 | 33.2 | 35.5 | 3.7 | 0.8 | 1.0 | 1.2 | 99.1 |
| Palm st:CO | 0.6 | 20.6 | 2.7 | 36.8 | 38.0 | 0.6 | 0.6 | 1.0 | 1.0 | 98.5 |
| At 10° C. | | | | | | | | | | |
| Palm st:SFO | 0.6 | 20.8 | 3.5 | 35.3 | 39.1 | 0.1 | 0.8 | 1.0 | 1.1 | 97.9 |
| Palm st:SBO | 0.6 | 25.7 | 3.5 | 33.1 | 32.9 | 3.5 | 0.8 | 1.0 | 1.0 | 93.9 |
| Palm st:CO | 0.6 | 24.0 | 2.6 | 36.0 | 35.5 | 0.6 | 0.8 | 1.0 | 1.0 | 93.5 |
| At 20° C. | | | | | | | | | | |
| Palm st:SFO | 0.6 | 26.8 | 4.0 | 34.6 | 33.2 | 0.2 | 0.9 | 1.0 | 1.0 | 87.4 |
| Palm st:SBO | 0.6 | 29.2 | 3.9 | 33.1 | 29.4 | 3.0 | 1.0 | 1.0 | 1.0 | 86.7 |
| Palm st:CO | 0.6 | 23.9 | 2.8 | 35.9 | 35.5 | 0.6 | 0.8 | 1.0 | 1.0 | 93.4 |

In accordance with the invention, there is another fraction of the oil, the more saturated and solid part of the oil, also known as stearin which is produced in the same process. It is also part of the invention that the composition of the stearins is of use in margarine and shortenings based on the solid fat contents. It is also possible that the stearins may be further fractionated for more products.

Example 4

Palm stearins produced by the fractionation of palm oil-unsaturated (9:1) blends. The ratio for the saturated fatty acids:monounsaturated:polyunsaturated acids are in the range of (1.2 to 1.7):1.0:(0.3 to 0.5). The solid content profile of the blends fractionated at 110° C. to 8° C. are that of palm oil and thus can find similar applications as that of palm oil.

TABLE 4

Major fatty acids of stearins from fractionation of palm oil:unsaturated oil blends (9:1).

| | C14 | C16 | C18 | C18-1 | C18-2 | C18-3 | Sat. | Mono | Poly |
|---|---|---|---|---|---|---|---|---|---|
| 8° C. | | | | | | | | | |
| Palm oil:SFO | 0.9 | 42.7 | 4.6 | 37.5 | 13.6 | 0.4 | 1.3 | 1.0 | 0.4 |
| Palm oil:SBO | 0.9 | 43.4 | 4.7 | 36.7 | 12.6 | 1.0 | 1.3 | 1.0 | 0.3 |
| Palm oil:CO | 0.9 | 44.9 | 4.6 | 36.5 | 12.1 | 0.6 | 1.4 | 1.0 | 0.3 |
| 10° C. | | | | | | | | | |
| Palm oil:SFO | 1.0 | 44.3 | 4.8 | 36.5 | 12.8 | — | 1.4 | 1.0 | 0.4 |
| Palm oil:SBO | 0.9 | 46.8 | 4.9 | 34.6 | 11.2 | 1.0 | 1.5 | 1.0 | 0.3 |
| Palm oil:CO | 1.0 | 44.9 | 4.7 | 35.5 | 12.7 | 0.2 | 1.4 | 1.0 | 0.4 |
| 20° C. | | | | | | | | | |
| Palm oil:SFO | 1.0 | 47.0 | 4.8 | 34.1 | 12.0 | 0.5 | 1.5 | 1.0 | 0.4 |
| Palm oil:SBO | 0.9 | 48.8 | 4.7 | 33.2 | 10.8 | 0.9 | 1.6 | 1.0 | 0.3 |
| Palm oil:CO | 1.0 | 46.9 | 4.5 | 34.8 | 11.7 | 0.6 | 1.5 | 1.0 | 0.3 |

TABLE 5

SFC of Stearins obtained from PO/UO 9:1
SFC Properties of Stearins

|  | 10 | 15 | 20 | 25 | 30 | 35 | 40 | 45 | 50 |
|---|---|---|---|---|---|---|---|---|---|
| PO/SFO 8° C. | 56.6 | 43.5 | 30.6 | 16.3 | 11.1 | 7.7 | 5.5 | 1.4 | — |
| PO/SBO 8° C. | 57.1 | 43.8 | 30.4 | 16.2 | 10.5 | 7.6 | 5.7 | 1.2 | — |
| PO/CO 8° C. | 55.7 | 42.1 | 29.0 | 15.0 | 10.6 | 7.0 | 5.4 | 1.4 | — |
| PO/SFO 10° C. | 57.2 | 44.2 | 31.5 | 17.2 | 11.9 | 8.4 | 7.1 | 2.2 | — |
| PO/SBO 10° C. | 50.2 | 46.8 | 33.4 | 18.1 | 12.7 | 8.5 | 6.2 | 1.7 | — |
| PO/CO 10° C. | 59.7 | 46.2 | 33.2 | 17.5 | 12.4 | 8.5 | 6.5 | 0.5 | — |
| PO/SFO 20° C. | 70.1 | 62.8 | 52.3 | 37.0 | 28.3 | 21.7 | 17.4 | 12.0 | 3.5 |
| PO/SBO 20° C. | 63.1 | 52.9 | 41.0 | 26.0 | 19.5 | 14.6 | 11.3 | 6.0 | — |
| PO/CO 20° C. | 61.9 | 50.6 | 38.2 | 23.8 | 17.5 | 13.1 | 10.1 | 6.5 | — |
| PO | 51.8 | 37.8 | 22.8 | 14.4 | 9.0 | 6.3 | 4.3 | 0.3 | — |
| PO/SFO | 41.4 | 29.5 | 18.9 | 10.7 | 7.1 | 5.0 | 2.9 | 0.2 | — |
| PO/SBO | 43.0 | 31.0 | 19.4 | 11.5 | 7.3 | 5.4 | 3.6 | 0.1 | — |
| PO/CO | 43.3 | 31.2 | 19.2 | 11.3 | 7.5 | 5.2 | 2.6 | 0.3 | — |

Example 5

The solid fraction obtained from the fractionation of oil blends at 20° C., 10° C. and 8° C. show ratios of values from (1.1 to 2.0):1.0:(0.5 to 0.8) for the saturated:monounsaturated:polyunsaturated fatty acids. These composition and solid content profile are of use in margarine and shortenings. These also have solid content profile close to that of palm oil and thus can find applications where palm oil is utilised as solid fats.

TABLE 6

Major fatty acids of stearins from fractionation of palm oil:unsaturated oil blends (7:3)

|  | C14 | C16 | C18 | C18-1 | C18-2 | C18-3 | Sat. | Mono | Poly |
|---|---|---|---|---|---|---|---|---|---|
| At 8° C. | | | | | | | | | |
| Palm oil:SFO (7:3) | 0.9 | 37.7 | 4.6 | 33.5 | 22.9 | — | 1.3 | 1.0 | 0.7 |
| Palm oil:SBO (7:3) | 0.9 | 40.2 | 4.8 | 32.4 | 20.3 | 1.4 | 1.4 | 1.0 | 0.7 |
| Palm oil:CO (7:3) | 0.9 | 40.0 | 4.5 | 33.0 | 20.2 | 0.6 | 1.4 | 1.0 | 0.6 |
| At 10° C. | | | | | | | | | |
| Palm oil:SFO (7:3) | 0.9 | 39.4 | 4.9 | 33.0 | 21.6 | — | 1.2 | 1.0 | 0.7 |
| Palm oil:SBO (7:3) | 1.0 | 42.7 | 4.7 | 32.5 | 17.8 | 1.4 | 1.5 | 1.0 | 0.6 |
| Palm oil:CO (7:3) | 0.9 | 42.1 | 4.7 | 32.4 | 18.5 | 0.6 | 1.5 | 1.0 | 0.6 |
| At 20° C. | | | | | | | | | |
| Palm oil:SFO (7:3) | 1.1 | 49.2 | 4.7 | 28.0 | 16.6 | 0.2 | 2.0 | 1.0 | 0.6 |
| Palm oil:SBO (7:3) | 1.1 | 49.2 | 5.0 | 28.0 | 15.2 | 1.5 | 2.0 | 1.0 | 0.6 |
| Palm oil:CO (7:3) | 1.1 | 48.6 | 4.8 | 27.9 | 16.1 | 0.6 | 2.0 | 1.0 | 0.6 |

TABLE 7

SFC of Stearin obtained from PO/UO (7:3)
SFC of Stearins

|  | 10 | 15 | 20 | 25 | 30 | 35 | 40 | 45 | 50 | 55 |
|---|---|---|---|---|---|---|---|---|---|---|
| PO/SFO 8° C. | 43.0 | 33.6 | 21.6 | 13.7 | 9.8 | 7.5 | 3.9 | 0.7 | — | — |
| PO/SBO 8° C. | 46.5 | 36.7 | 24.1 | 14.6 | 10.1 | 7.6 | 5.0 | 0.1 | — | — |
| PO/CO 8° C. | 47.3 | 38.5 | 25.5 | 16.2 | 10.9 | 9.1 | 5.6 | 1.2 | — | — |
| PO/SFO 10° C. | 47.2 | 37.4 | 25.1 | 15.2 | 10.6 | 8.2 | 5.2 | 0.7 | — | — |
| PO/SBO 10° C. | 47.7 | 38.6 | 26.1 | 16.0 | 11.5 | 8.7 | 6.0 | 1.7 | — | — |
| PO/CO 10° C. | 53.6 | 44.7 | 31.0 | 19.7 | 13.0 | 10.0 | 6.9 | 2.2 | — | — |
| PO/SFO 20° C. | 61.1 | 55.0 | 45.5 | 36.5 | 29.4 | 23.5 | 18.1 | 12.8 | 6.2 | — |
| PO/SBO 20° C. | 62.6 | 55.4 | 46.4 | 36.8 | 29.8 | 23.6 | 18.4 | 12.8 | 6.9 | — |
| PO/CO 20° C. | 65.4 | 59.4 | 49.3 | 39.5 | 31.6 | 25.7 | 21.0 | 14.7 | 8.2 | — |
| PS | 51.8 | 37.8 | 22.8 | 14.4 | 9.0 | 6.3 | 4.3 | 0.3 | — | — |
| PO/SFO | 28.6 | 18.4 | 11.8 | 6.5 | 5.1 | 2.9 | 0.9 | — | — | — |

TABLE 7-continued

SFC of Stearin obtained from PO/UO (7:3)
SFC of Stearins

|       | 10   | 15   | 20   | 25  | 30  | 35  | 40  | 45 | 50 | 55 |
|-------|------|------|------|-----|-----|-----|-----|----|----|----|
| PO/SBO | 28.9 | 20.7 | 12.0 | 7.4 | 4.5 | 3.1 | 0.9 | —  | —  | —  |
| PO/CO  | 29.0 | 19.4 | 11.4 | 6.9 | 4.2 | 3.2 | 1.0 | —  | —  | —  |

Example 6

By fractionation of the blends under conditions of 20° C., 10° C. and 8° C., the new stearins have compositions in the ratio of (1.5 to 2.0):1.0:(0.6 to 0.9) for the saturated:monounsaturated:polyunsaturated fatty acids.

TABLE 8

Major fatty acids of stearins from fractionation of palm stearin:unsaturated oil blends (7:3)

|            | C14 | C16  | C18 | C18-1 | C18-2 | C18-3 | Sat. | Mono | Poly |
|------------|-----|------|-----|-------|-------|-------|------|------|------|
| 8° C.      |     |      |     |       |       |       |      |      |      |
| Palm st:SFO | 0.8 | 40.8 | 4.5 | 29.3  | 22.8  | 0.9   | 1.6  | 1.0  | 0.8  |
| Palm st:SBO | 0.9 | 43.7 | 4.6 | 28.3  | 20.0  | 1.9   | 1.7  | 1.0  | 0.8  |
| Palm st:CO  | 0.9 | 42.4 | 4.2 | 30.3  | 21.5  | 0.2   | 1.6  | 1.0  | 0.7  |
| 10° C.     |     |      |     |       |       |       |      |      |      |
| Palm st:SFO | 0.9 | 41.9 | 4.6 | 29.5  | 22.4  | 0.1   | 1.6  | 1.0  | 0.8  |
| Palm st:SBO | 0.9 | 43.6 | 4.6 | 28.1  | 20.0  | 1.9   | 1.7  | 1.0  | 0.8  |
| Palm st:CO  | 0.9 | 44.3 | 4.3 | 29.8  | 20.2  | 0.2   | 1.7  | 1.0  | 0.7  |
| 20° C.     |     |      |     |       |       |       |      |      |      |
| Palm st:SFO | 0.9 | 45.9 | 4.7 | 27.9  | 19.7  | 0.1   | 1.8  | 1.0  | 0.7  |
| Palm st:SBO | 1.0 | 48.4 | 4.7 | 26.3  | 17.2  | 1.6   | 2.0  | 1.0  | 0.7  |
| Palm st:CO  | 0.9 | 47.8 | 4.4 | 28.1  | 17.9  | 0.2   | 1.9  | 1.0  | 0.7  |

TABLE 9

SFC of stearins obtained from PS/UO (7:3)
SFC of stearins

|             | 10   | 15   | 20   | 25   | 30   | 35   | 40   | 45   | 50  |
|-------------|------|------|------|------|------|------|------|------|-----|
| PS/SFO 8° C. | 51.9 | 43.9 | 33.6 | 22.4 | 17.0 | 12.5 | 9.7  | 6.8  | —   |
| PS/SBO 8° C. | 57.5 | 49.6 | 39.2 | 25.7 | 19.4 | 14.5 | 11.7 | 7.6  | t   |
| PS/Co 8° C.  | 54.9 | 47.0 | 36.0 | 24.1 | 18.1 | 13.5 | 10.6 | 6.1  | —   |
| PS/SFO 10° C.| 55.1 | 47.3 | 37.4 | 24.7 | 18.9 | 14.1 | 10.8 | 6.4  | t   |
| PS/SBO 10° C.| 57.2 | 49.8 | 39.0 | 26.6 | 20.3 | 15.6 | 12.2 | 7.4  | t   |
| PS/CO 10° C. | 58.6 | 50.8 | 40.6 | 27.3 | 20.5 | 15.6 | 12.5 | 7.4  | 0.1 |
| PS/SFO 20° C.| 62.9 | 56.6 | 47.7 | 34.7 | 27.1 | 20.9 | 16.8 | 10.2 | 3.5 |
| PS/SBO 20° C.| 67.3 | 60.7 | 52.4 | 39.4 | 30.9 | 24.2 | 19.7 | 13.9 | 5.4 |
| PS/CO 20° C. | 65.2 | 58.9 | 49.6 | 37.9 | 28.4 | 22.9 | 18.0 | 12.1 | 5.3 |
| PS          | 76.4 | 61.1 | 54.1 | 37.8 | 24.7 | 18.5 | 14.3 | 9.8  | 2.3 |
| PS/SFO      | 47.3 | 39.2 | 28.7 | 19.9 | 14.4 | 11.1 | 7.7  | 4.3  | —   |
| PS/SBO      | 47.4 | 39.5 | 29.3 | 20.0 | 14.9 | 11.3 | 8.0  | 4.7  | —   |
| PS/CO       | 48.3 | 40.3 | 30.0 | 20.2 | 14.9 | 11.5 | 7.9  | 4.3  | —   |

Example 7

Oils of composition of saturated:polyunsaturated fatty acids are generally lower than the saturated, with saturated fatty acids being the higher of the two, and monounsaturated acids are of 1.0. Table 10 illustrates the case when the liquid fraction of oil blends of 9:1 ratios is further cooled. The liquid fraction of oil blends fractionated at 20° C. can be cooled again to obtain a fraction at 8° C. with the following types of oil composition ratios. The ratios are (0.8 to 1.1):1.0:(0.3 to 0.6).

TABLE 10

Refractionated of the liquid fraction of the blends of palm oil:unsaturated oil (9:1)-liquid fraction.

| Liquid fraction | Saturated | monounsaturated | Polyunsaturated | IV |
|-----------------|-----------|-----------------|-----------------|----|
| PO:SFO          | 0.9       | 1.0             | 0.5             | 77 |
| PO:SBO          | 0.8       | 1.0             | 0.5             | 76 |
| PO:CO           | 0.8       | 1.0             | 0.5             | 76 |

Example 8

The following illustrates the case when the liquid fraction of oil blends of 7:3 ratios are further cooled to temperature of 8° C. In this example, the monounsaturates remain at the 1.0 while the ratios for the saturates and polyunsaturates are lower than 1.0, with the saturates being the lower of the two. The range is (0.6 to 0.9):1.0:(0.7 to 1.0).

TABLE 11

Refractionation of the solid fraction of the blends of palm oil:unsaturated oil (7:3)-liquid fraction

| Liquid fraction | Saturated | Monounsaturated | Polyunsaturated | IV |
|---|---|---|---|---|
| PO:SFO | 0.7 | 1.0 | 0.9 | 91 |
| PO:SBO | 0.8 | 1.0 | 0.9 | 93 |
| PO:CO | 0.7 | 1.0 | 0.9 | 89 |

Example 9

This example illustrates the fractionation of the solid fraction obtained from the 20° C. fractionation of oil blends 7:3. The solid fraction is heated to 75° C. to 80° C. to melt all crystal history. The oil is then cooled to 50° C., maintained for 30 minutes to 1 hour and then further cooled to 30° C. This is maintained for 3 hours and the crystals are filtered. The composition of the liquid fraction of the process has composition observed in table 12, where monounsaturated:polyunsaturated fatty acids have ratio close to 1.0, while that of saturated fatty acids are slightly lower. The range is (0.6 to 0.9):1.0:(0.9 to 1.2).

TABLE 12

Refractionation of the solid fraction of the blends of Palm stearin:unsaturated oils (7:3)-liquid fraction

| Liquid fraction | Saturated | Monounsaturated | Polyunsaturated | IV |
|---|---|---|---|---|
| PS:SFO | 0.7 | 1.0 | 1.1 | 98 |
| PS:SBO | 0.8 | 1.0 | 1.1 | 97 |
| PS:CO | 0.8 | 1.0 | 1.0 | 93 |

Example 10

This example illustrates the case when the following oils mixed with sunflower oils in the ratio of 7:3 are cooled to the following temperature. It is possible to obtain oil where the composition of the saturated and polyunsaturated fatty acids resembles that for some olive oils. The liquid fraction obtained has the composition almost close to olive oil 1 of this example. Ratios of the fatty acids percentage are of 16% to 25%, 50% to 60% and 13% to 20% for the saturated acids, monounsaturated acids and polyunsaturated acids.

TABLE 13

Olein from PS:SFO (7:3) at 8° C.

|  | Saturated % | Monounsaturated % | Polyunsaturated % |
|---|---|---|---|
| Olein | 23 | 58.7 | 16.6 |
| Olive 1 | 16 | 66 | 16 |
| Olive 2 | 13 | 75 | 9 |

Example 11

In this example, a fraction suitable for milk fat formula for children where oleic acid content is from 28% to 46% and palmitic acid from 18% to 28% can be derived from some blends.

TABLE 14

Major fatty acids of oleins from palm oil and unsaturated oil blends (9:1)

|  | C14 | C16 | C18 | C18-1 | C18-2 | C18-3 | Sat | Mono | Poly |
|---|---|---|---|---|---|---|---|---|---|
| 8° C. | | | | | | | | | |
| Palm oil:SFO | 0.8 | 25.8 | 3.2 | 46.9 | 22.2 | 0.5 | 0.6 | 1.0 | 0.5 |
| Palm oil:SBO | 0.8 | 27.6 | 3.1 | 45.8 | 20.2 | 1.7 | 0.7 | 1.0 | 0.4 |
| Palm oil:CO | 0.8 | 27.6 | 2.9 | 46.2 | 21.1 | 0.7 | 0.7 | 1.0 | 0.5 |
| 10° C. | | | | | | | | | |
| Palm oil:SFO | 0.9 | 28.1 | 3.3 | 45.3 | 21.4 | 0.2 | 0.7 | 1.0 | 0.5 |
| Palm oil:SBO | 0.8 | 29.0 | 3.2 | 44.5 | 20.0 | 1.7 | 0.7 | 1.0 | 0.4 |
| Palm oil:CO | 0.9 | 28.3 | 3.0 | 44.5 | 21.8 | 0.4 | 0.7 | 1.0 | 0.5 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A blending and fractionation process for obtaining an oil composition, the process including the steps of:
   (a) blending a palm stearin with an unsaturated oil having an oleic content of more than 20% and linoleic and linolenic contents of more than 30% in a predetermined ratio to form a mixture;
   (b) heating the mixture at a temperature of between 50° C. to about 65° C. until all crystals are melted;
   (c) fractionating the mixture obtained from step (b) at temperatures of 20° C., 10° C. and 8° C. successively to provide fractions in order to produce nucleation and obtain a mixture of oil and crystals wherein the crystals are of a suitable size and shape which permit efficient separation of the oil and crystals; and
   (d) separating the mixture of oil and crystals from the fractions to obtain the oil composition, wherein said oil composition contains saturated fatty acids, monounsaturated fatty acids and polyunsaturated fatty acids in a ratio of about 0.5 to 1.0:1.0:0.3 to 1.2.

2. The process as claimed in claim 1, wherein step (d) the mixture of oil and crystals is separated using a low or high pressure filter press.

3. The process as claimed in claim 1, wherein the ratio of the palm stearin and the unsaturated oil is from 9:1 to 1:9 of palm stearin:unsaturated oil, preferably from 9:1 to 5:5.

4. The process as claimed in claim 1, wherein the crystallization is conducted between 4 to 24 hours.

5. The process as claimed in claim 1, wherein the unsaturated oil is soybean oil, sunflower oil, corn oil, canola oil or rapeseed oil.

6. The process as claimed in claim 1, wherein the oil composition is utilized as salad oils or cooking oils.

7. The process as claimed in claim 1, wherein the oil composition obtained is utilized in milk fat formula.

8. The process as claimed in claim 1, wherein the stearins obtained are utilized in margarine and shortenings.

9. The process of claim 1, wherein crystallization of the oil blends is performed with a crystallizer with a high cooling surface to oil volume ratio and high heat exchange coefficient.

10. The process of claim 1, wherein cooling of the liquid obtained from step (b) is carried out from a temperature of above the melting point of the oils to that of temperatures from about 8° C. to about 20° C.

11. The process of claim 1, wherein in step (c), crystal size is controlled to suitable polymorphs and of generally uniform size to allow ease of filtration.

12. The process of claim 1, wherein step (d) involves filtration carried out at a temperature of at least about 10° C. below ambient.

13. An oil composition, which remains clear and liquid at 15° C. obtained from a process for obtaining oil composition, which includes the steps of:
   (a) blending a palm stearin with an unsaturated oil having an oleic content of more than 20% and linoleic and linolenic contents of more than 30% in a predetermined ratio to form a mixture;
   (b) heating the mixture at a temperature of between 50° C. to about 65° C. until all crystals are melted;
   (c) cooling the liquid obtained from step (b) to produce nucleation and obtain a mixture of oil and crystals wherein the crystals are of a suitable size and shape which permit efficient separation of the oil and crystals; and
   (d) separating the mixture of oil and crystals to obtain the oil composition, wherein said oil composition contains saturated fatty acids, monounsaturated fatty acids and polyunsaturated fatty acids in a ratio of about 0.5 to 1.0:1.0:0.3 to 1.2.

14. The oil composition as claimed in claim 13, wherein the mixture of oil and crystals is separated using a low or high pressure filter press.

15. The oil composition as claimed in claim 13, wherein the ratio of the palm stearin and the unsaturated oil is from 9:1 to 1:9 of palm stearin:unsaturated oil, preferably from 9:1 to 5:5.

16. The oil composition as claimed in claim 13, wherein the crystallization is conducted between 4 to 24 hours.

17. The oil composition as claimed in claim 13, wherein the unsaturated oil is soybean oil, sunflower oil, corn oil, canola oil or rapeseed oil.

18. The oil composition as claimed in claim 13, wherein the oil composition is utilized as salad oils or cooking oils.

19. The oil composition as claimed in claim 13, wherein the oil composition obtained is utilized in milk fat formula.

20. The oil composition as claimed in claim 13, wherein the stearins obtained are utilized in margarine and shortenings.

21. The oil of claim 13, wherein the oleic acid content is from 28% to 46% and palmitic acid content is from 18% to 28%.

22. The oil of claim 13, wherein palmitic acid, oleic acid and linoleic acid are within the range of infant fats and milk from lactating mothers.

* * * * *